P. PLATTER.
Seed Planter.
No. 24,703.
Patented July 5, 1859.
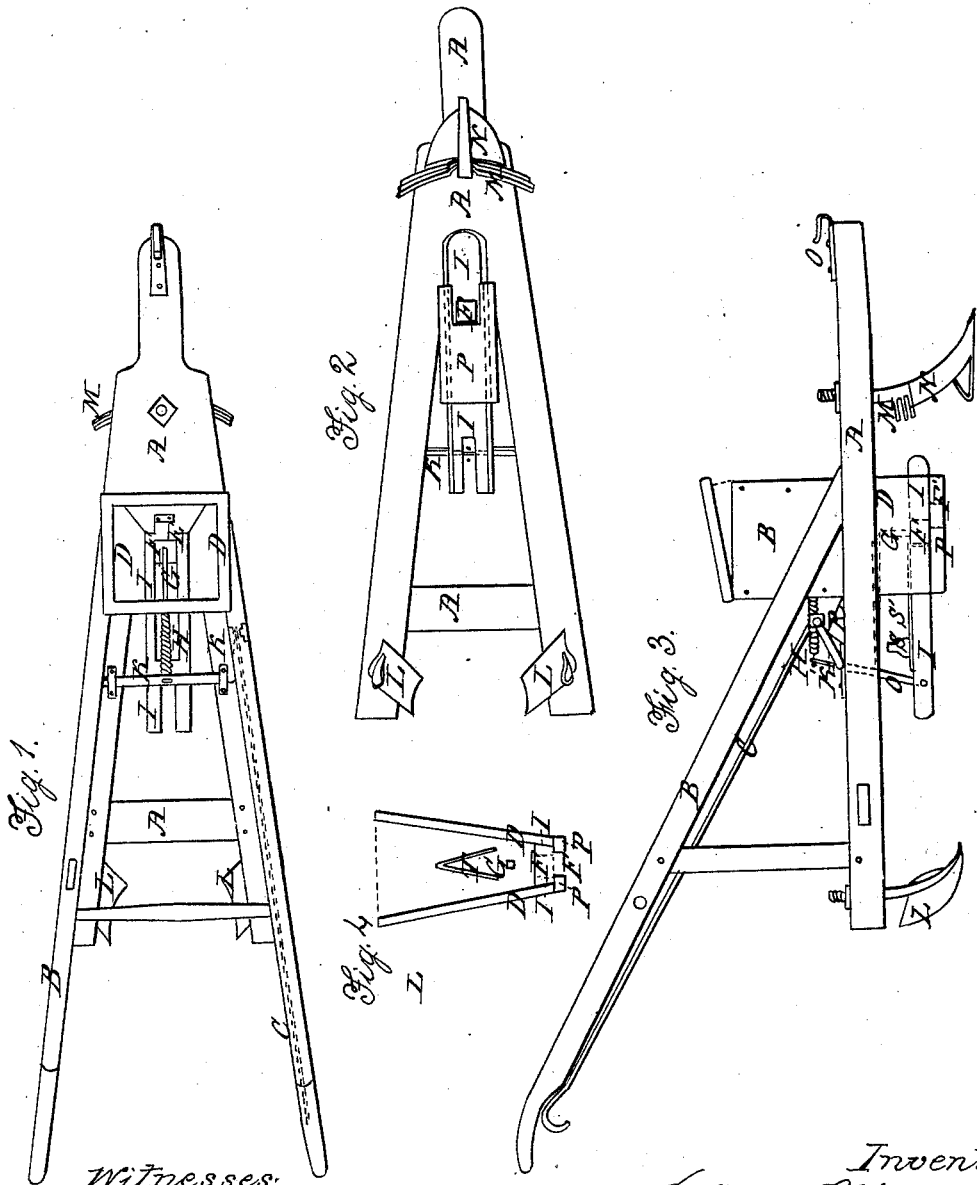

UNITED STATES PATENT OFFICE.

PETER PLATTER, OF MOORE'S HILL, INDIANA, ASSIGNOR TO HIMSELF AND JAMES S. FLEMMING, OF SAME PLACE.

IMPROVEMENT IN CORN-PLANTERS.

Specification forming part of Letters Patent No. 24,703, dated July 5, 1859.

*To all whom it may concern:*

Be it known that I, PETER PLATTER, of Moore's Hill, in the county of Dearborn and State of Indiana, have invented a new and useful Improvement in Corn-Planters; and I do hereby declare that the following is a full and clear description thereof, reference being had to the accompanying drawings and the letters of reference marked thereon, making part of this specification.

The nature of my invention consists in certain improvements in corn-planters, by which corn may be planted at desired intervals, as hereinafter explained.

Figure 1 is a top view, and Fig. 2 a bottom view, of the planter. Fig. 3 is a side elevation, showing especially the device for operating the sliding feed-bar. Fig. 4 is a vertical section of seed-hopper, showing the arrangement of the double guard-plate.

A represents the frame, and B the handles, of the planter.

D is a seed-hopper, formed with a bottom, P, in the forward part of which is made the slot F'.

I is a sliding feed-bar, formed with a seeding-aperture, F, and provided with an adjustable regulator, S', which may be adjusted to the quantity of seed required to be planted by means of the set-screw S.

K is a crank shaft, formed with a crank, K', and secured to the frame A by means of boxes or brackets in such manner as to allow of its semi-rotation.

O is a lever, made to pass through the crank-shaft K, its upper end being connected with a spring, H, and the lower end with the sliding feed-bar I. Attached to the lever O, and extending forward through a slot into the feed-hopper D, is a hooked rod or agitator, G, by means of which security of feeding the seed to the aperture in the bar I is secured.

C is a rod, one end of which is attached to the crank K' and the other end in proximity to the handle B, so as to be convenient for the operator.

R is a rest for the crank K'.

T is a double guard-plate, arranged within the hopper D in such manner as to prevent the seed from pressing upon the agitator G and feed-bar I, and at the same time to allow the seed free and certain passage to the opening F.

N is a plow formed with the clod-movers M, and arranged at the forward part of the frame A, so that it may open a furrow for the deposit of seed.

L L are shovel-plows, arranged at the heel of the frame A, so that by their use the dropped seed may be covered.

The planter may be operated as follows: Seed being placed in the hopper D and the planter being moved forward, the operator draws the rod C back, by means of which the shaft K will be made partially to rotate, which, by means of the lever O, will force the feed-bar I forward until the aperture F comes opposite the slot F' of the bottom P, when the seed will be deposited. The rod C will then be freed by the operator, and the bar I will be returned by means of the spring H, and the hammer or agitator G will be depressed, so as to insure the filling of the aperture F, ready to perform again the operation of depositing the seed. But there is another and very important point in this planter, which is that hammer G, worked off the same rock-shaft which moves feed-bar I, works under the protection of the double shield or guard-plate T, which acts like a double roof, giving the hammer G room to rise and fall without impediment from the pressure of the seed in the hopper or striking against the roof of the shield. The falling of the hammer packs the grain in the seed-cup; but the rising of it produces just the opposite effect, loosening the grain or seed in the upper part of the grain-cup.

What I claim as my invention, and desire to secure by Letters Patent, is—

The arrangement of the shield T, hammer G, sliding feed-bar I, lever O, crank-shaft K, and spring H, the whole being constructed for operation conjointly, as and for the purpose set forth.

PETER PLATTER.

Witnesses:
H. E. CLIFTON,
R. S. CAMPBELL.